United States Patent [19]

Sedalis

[11] 4,317,201

[45] Feb. 23, 1982

[54] ERROR DETECTING AND CORRECTING RAM ASSEMBLY

[75] Inventor: Patrick A. Sedalis, North Wales, Pa.

[73] Assignee: Honeywell, Inc., Minneapolis, Minn.

[21] Appl. No.: 136,262

[22] Filed: Apr. 1, 1980

[51] Int. Cl.³ .............................................. G06F 11/10
[52] U.S. Cl. ........................................ 371/38; 371/13
[58] Field of Search .................................. 371/13, 38

[56] References Cited

U.S. PATENT DOCUMENTS

| | | | |
|---|---|---|---|
| 4,037,091 | 7/1977 | Beuscher | 371/13 |
| 4,175,692 | 11/1979 | Watanabe | 371/38 |
| 4,216,541 | 8/1980 | Clover et al. | 371/38 |

OTHER PUBLICATIONS

Christensen and Pattin, Jr., Stuck-Track Error Correction, IBM Technical Disclosure Bulletin, vol. 13, No. 7, Dec. 1970, pp. 1844–1846.

*Primary Examiner*—Charles E. Atkinson
*Attorney, Agent, or Firm*—Laurence J. Marhoefer; Lockwood D. Burton

[57] ABSTRACT

A RAM assembly, or card, includes a random access memory portion for the data bits, as well as a random access memory portion for corresponding check bits. The card includes a parity generator and a parity comparator to determine the presence of an error. There is also included a decoder to decode the output of the comparator to determine the nature and position of the error. The error is not only corrected in the transmission to the central processor but is also fed back to correct the error in the RAM itself. Thus the errors that would appear in the RAM do not accumulate.

7 Claims, 2 Drawing Figures

ERROR DETECTING AND CORRECTING RAM ASSEMBLY

BACKGROUND OF THE INVENTION

The present invention relates to a computer system. More particularly, it relates to an improved random access memory assembly for a computer.

Heretofore, there have been provided computer systems having random access memory assemblies or cards. These systems have included means for detecting errors in the data stored in the random access memory unit (RAM). Such systems have usually provided means for detecting a single error or a double error and with a capability of correcting a single error in the transmitted data derived from the RAM. As noted, the system is capable of correcting single errors in the forward transmission of data. If a double error occurs, an alarm is effected and the system either shuts down or bypasses the erroneous data. In either event, the double error constitutes a fatal error so far as the affected transaction is concerned. If a single error occurs on one cycle of reading from the RAM, the forward transmission is corrected but the error remains in the RAM. If, on a subsequent addressing of the RAM, a second error appears, that second error becomes cumulative with the first error and, therefore, becomes a fatal double error.

SUMMARY OF THE INVENTION

It is accordingly, an object of the present invention to provide an improved random access memory assembly for computers.

It is another object of the present invention to provide an improved RAM as set forth which avoids the accumulation of correctable errors within the RAM. It is a further object of the present invention to provide an improved RAM assembly featuring error detection and correction circuitry.

In accomplishing these and other objects, this has been provided, in accordance with the present invention, a RAM assembly, or card, which includes a random access memory portion for the data bits, as well as a random access memory portion for corresponding check bits. The card includes a parity generator and a parity comparator to determine the presence of an error. There is also included a decoder to decode the output of the comparator to determine the nature and position of the error. The error is not only corrected in the transmission to the central processor but is also fed back to correct the error in the RAM itself. Thus the errors that would appear in the RAM do not accumulate.

BRIEF DESCRIPTION OF THE DRAWINGS

A better understanding of the present invention may be had from the following detailed description when read in the light of the accompanying drawings in which.

DETAILED DESCRIPTION

Figure 1:
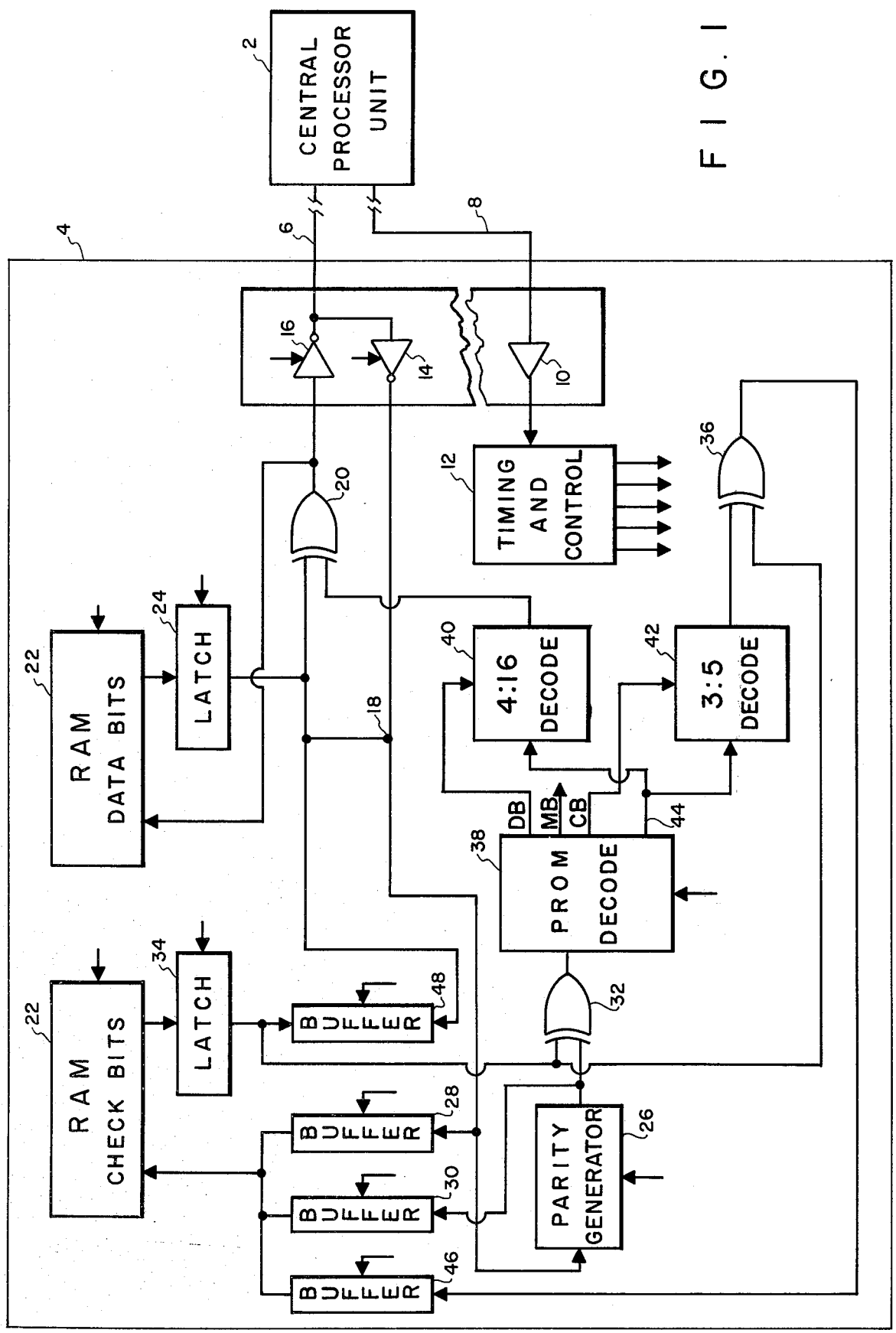
FIG. 1 is a block diagram of a RAM card embodying the present invention.

Referring now to the drawings in more detail there is shown in FIG. 1 a central processor unit 2. The central processor unit 2 provides the primary control for the storing of data in the RAMS and the extraction of data from the RAMS. To this end, the central processor unit 2 is connected to the RAM assembly or card 4 by a cable structure representing a data bus 6 and a control-address bus 8. The control and address bus 8 is connected to suitable input buffers 10 on the RAM card 4. The output of the buffers 10 are then applied to a timing and control circuit 12. The timing and control circuit 12, in response to the control and address signals from the central processor 2 generates the internal sequence of operations and addressing of the RAM card 4.

The data bus 6 from the central processor unit 2 is connected, on the RAM card 4 to a plurality of line receivers and drivers 14 and 16, respectively. These line receivers and drivers 14 and 16 may, in the preferred embodiment, comprise tri-state buffer units. As such they may be selectively gated to pass or block the transmission of data therethrough, under the control of suitable signals of the timing and control circuit 12. The output of the line receivers 14 are connected to a first junction 18. The junction 18 is connected to one input terminal of an EXCLUSIVE-OR gate 20. The output of the EXCLUSIVE-OR gate 20 is connected to the input terminals of a data bit storage portion of a RAM 22. The output of the EXCLUSIVE-OR gate 20 is also connected to the input of the line driver 16 for transmission back to the central processor by way of the bus 6. The output of the data bit storage portion of the RAM 22 is connected through a holding latch 24 to the same or first input terminal of the EXCLUSIVE-OR gate 20.

The junction 18 is also connected to the input of a parity generator 26. The junction 18 is also connected, through a buffer 28, to the input of a check bit storage portion of the RAM 22. The output of the parity generator 26 is connected through a second buffer 30 to the input of the check bit storage portion of the RAM 22. The output of the parity generator 26 is also connected to one input terminal of a check bit comparator 32 which is shown as an EXCLUSIVE-OR gate. The outputs of the check bits storage portion of the RAM 22 is coupled through a holding latch 34 to the second input of the comparator 32 and to a first input of an EXCLUSIVE-OR gate 36. The output of the comparator 32 is applied to the input of a PROM decoder 38. While the output of the parity generator 26 is illustrated with a single line, and the comparator 32 is illustrated as being a single EXCLUSIVE-OR gate, it should be recognized that the output of the parity generator, in the preferred embodiment, is a five-bit parallel output and the comparator is, in fact five such EXCLUSIVE-OR gates. Thus the input to the PROM decoder 38 is a five bit parallel input.

The decoder 38 is arranged to provide a preliminary decode of the data input thereto. The decoder 38 must first determine from the pattern of the error signals, if any, applied to the input thereof whether there is a single bit error or a multiple bit error. If a multiple bit error is detected, there will be an active signal on the MB output line from the decoder 38. That signal would be transmitted back to the central processor unit 2 as an alarm signal. If a single bit error is detected, then the decoder 38 will determine whether the error is in one of the data bits or in one of the check bits. If the error is detected in the data bits, the output line DB would be active to provide an enabling signal for a further decoder 40. If the single bit error had been detected as being in the check bit portion, the output line CB would be activated to produce an enabling signal for a still further decoder 42. A further output lead 44 from the decoder 38 is, in the illustrative embodiment, four conductors carrying a four bit parallel code word. The four bit parallel code word is connected by the cable 44 to corresponding inputs of the decoder 40. In the illustrative embodiment, the data portion of the word comprises a sixteen-bit data word. Thus the second decoder 40 translates the four input bits into a one-out-of-sixteen output bits. While the output of the decoder 40 is illustrated as a single lead, it is, in the illustrative embodiment, sixteen parallel leads each connected to one input terminal of a corresponding sixteen EXCLUSIVE-OR gates 20.

Since the check bit portion of each word has been designated as a five bit word, the third decode unit 42 has only three input leads. These are three of the four leads in the output cable 44. While the three input leads to the decoder 42 is sufficient to define one-out-of-eight output leads, only five such output leads are of interest. Consequently the output from the decoder unit 42 is representative of five such output leads, each connected to one input terminal of the corresponding five EXCLUSIVE-OR gates 36. The outputs of the EXCLUSIVE-OR gates 36 is connected through a buffer 46 to the input of the check bits storage portion of the RAM 22. It was previously noted that the output of the latch 34 connected to the output of the check bit storage portion of the RAM 22 was connected to one input terminal of the comparator 32. The output of the latch 34 is also connected through a buffer 48 to the first input terminals of the EXCLUSIVE-OR gate 20. While in the illustrative embodiment, the EXCLUSIVE-OR gate 20 represents sixteen such gates, the output of the buffer 48 is only connected to five of them.

In operation the buffers 28 and 48 are only used in the environment of providing a check on the efficacy of the error detection and correction system. To that end, a predetermined control signal may be transmitted from the central processor unit through the line receivers 14 and transmitted by the buffer 28 into an addressed portion of the check bits storage portion of the RAM 22. The buffer 28 is, of course, gated by a control signal from the timing and control unit 12 which, in turn, responds to control signals from the central processor unit. In this way, a predetermined five bit code word can be stored in any selected RAM address without that five bit code word having been developed by the parity generator 26. Similarly any five bit check bit word may be directly read from the check bit storage portion of the RAM 22 through the enabling of the latch 34 and the buffer 48. Under control of the timing and control signals from the timing and control unit 12, which is, in turn, controlled by signals from the central processor unit 2, the latch 34 and the buffer 48 are enabled to apply the selected five bit word to the EXCLUSIVE-OR gates 20, thence through the line drivers 16 to the central processor unit. Thus, the central processor unit may write directly into the check bit portion of the RAM 22 or read directly from the check bit storage portion of the RAM 22, this with a view to directly reading the contents of any given address. Similarly, such combination may be used, under the control of the central procesor unit 2 to force a false or erroneous entry, to determine the operability of the error detection and correction code structure. Neither the buffer 28 or 48 are used in the normal operation of the present invention other than for test and check purposes.

Figure 2:
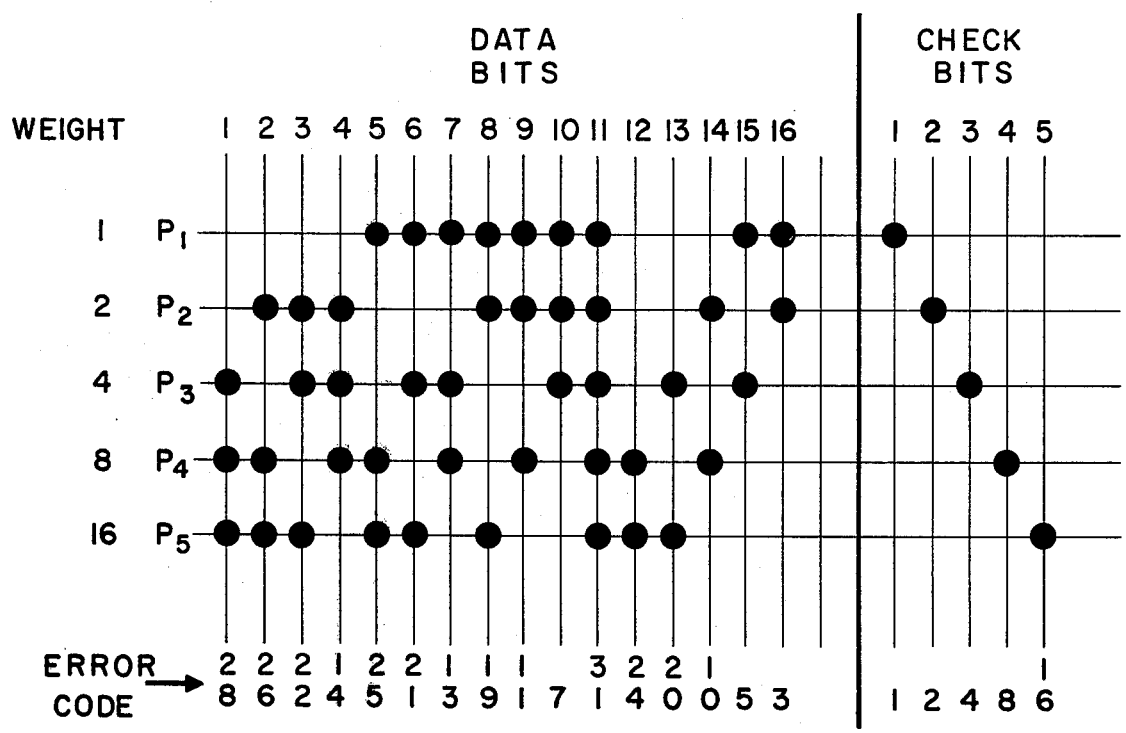
FIG. 2 is a diagram of parity field assignment in accordance with an aspect of the present invention.

For regular operation, when the central processor unit has indicated a write to memory mode of operation, the appropriate control signals are transmitted from the central processor unit 2 by way of the connector 8 and the line receiver 10 to the timing and control unit 12. Under the control of the control unit 12, the line receivers 14 are enabled. Here again, the single illustrated line receiver 14 is representative, in the illustrative embodiment, of sixteen such line receivers. The output of the line receivers is transmitted to the junctions 18 thence to the first input terminals of the EXCLUSIVE-OR gates 20. With the system in the write mode, the EXCLUSIVE-OR gates 20 are clamped in their noninverting mode. Therefore the data signals transmitted from the central processor unit are written into the selected address in the data bit storage portion of the RAM 22. Simultaneously, the data bits transmitted from the central processor unit through the line receiver 14 to the junction 18 are also transmitted to the input of the parity generator 26. The parity generator 26 responds to the sixteen input data bits in accordance with the relationship illustrated in FIG. 2, to produce five check bits. The five check bits are then transmitted through the buffer 30, enabled by the timing and control circuit 12 to be loaded into the appropriate address in the check bit storage portion of the RAM 22. In this manner the data bits and the corresponding check bits are stored in the appropriate address locations within the RAM 22.

When the central processor unit has decreed a READ cycle, the appropriate control instructions are transmitted from the central processor unit to the timing and control circuit 12. The appropriate locations in the data bit storage portion of the RAM 22 are addressed and the data bits stored therein are transferred to the holding latch 24. Here again, while the latch 14 is illustrated as being a single element with a single input and with a single output, the structure is representative, in the illustrative embodiment, of a sixteen bit latch with sixteen parallel line inputs and sixteen parallel line outputs. These sixteen parallel line outputs are connected to the first input terminal of the corresponding number of EXCLUSIVE-OR gates 20. The output of the latch 24 is also applied through the junction 18 to the sixteen-bit parallel input to the parity generator 26. When the system is in the READ mode, the buffer 30 is blocked by the timing and control circuit 12. The output of the parity generator 26, a five-bit code, is applied to the input terminals of the comparator 32, which again represents the five such comparators. Simultaneously, the corresponding location in the check bit storage portion of the RAM 22 is addressed and the check bits corresponding to the addressed word in the data bit storage portion of the RAM is extracted from the check bits storage portion and applied to the holding latch 34. The latch 34 transmits the five check bits to the other input terminals of the comparators 32 where they are compared with the check bits generated by the parity generator corresponding to the data bits extracted from the data bit storage portion of the RAM 22. The check bit signals output from the latch 34 are also transmitted directly to the first input terminals of the five EXCLUSIVE-OR gates 36. If the check bit signals issued from the latch 34 identically match those generated by the parity generator 26, then the comparator 32 provides a zero output on all five bits to the decoder 38. In this case, both the EXCLUSIVE-OR gates 20 and the EXCLUSIVE-OR gates 36 are clamped in their noninverting mode. In that mode, the data bits from the data bit storage section of the RAM 22 are transmitted through the latch 24 and the EXCLUSIVE-OR gates 20 to the line drivers 16, thence to the central processor. Simultaneously, the output of the EXCLUSIVE-OR gates 20 are connected back to the input of the data bit storage section of the RAM 22 and the corresponding data bits are rewritten into the selected address in the RAM. Similarly, the check bits from the check bit storage portion of the RAM 22 is transmitted through the latch 34 and the EXCLUSIVE-OR gates 36 back to the input of the check bit storage portion of the RAM 22 by way of the buffer 46 which is now enabled. Thus, the check bits are rewritten back into the addressed portion of the RAM 22.

If, on the other hand, there had been a disparity between the check bits read from the check bit storage portion of the RAM 22 and those generated by the parity generator 26 as applied to the several inputs of the comparator 32, there would be an error signal from the output of the comparator to the input of the PROM decoder 38. From the five-bit error code signal, the PROM decoder would first determine whether there was a multiple bit error or a single bit error. If a multiple bit error is detected the output line from the PROM decoder MB would become active and signal an alarm condition to the central processor unit 2.

If a single bit error is detected, the decoder 38 determines whether the error lay in the data bit portion or in the check bit portion. If the error is detected to be in the data bit portion, the decoder 40 is enabled and the four-bit error code is applied to the input thereof. The decoder 40 then translates the four bit error code into a single one of the 16 output bit positions and places a logical HIGH signal on that output lead. That logical HIGH then clamps the corresponding one of the EXCLUSIVE-OR gates 20 to an inverting mode. That reversal mode causes the corresponding single bit of the data bits applied to the first input terminals of the EXCLUSIVE-OR gates 20 from the latch 24 to be reversed thereby correcting the error. The thus corrected data signal is transmitted from the output of the EXCLUSIVE-OR gates 20, through the line driver 16, to the central processor unit 2. Simultaneously, however, the output of the EXCLUSIVE-OR gates 20 is also applied back to the input of the data bit storage portion of the RAM 22 where the corrected data is now stored in the RAM, thereby avoiding the potential for errors to accumulate to produce a fatal double error.

Similarly, if the error had been detected by the decoder 38 to lie in the check bit portion, the decoder 42 would be enabled and the three-bit error code applied to the input thereof. The decoder 42 would then translate that three-bit error code to identify a single one of the five bits in the check bit word. A logical HIGH would then be applied to that single output, applied to the input of the corresponding one of the EXCLUSIVE-OR gates 36, clamping that individual EXCLUSIVE-OR gate into a reversing or inverting mode. That reversing mode causes a reversal of the corresponding one of the five check bits applied to the input terminals thereof from the latch 34, thereby correcting the erroneous bit. The corrected check bit word is then transmitted from the output of the EXCLUSIVE-OR gates 36 through the enabled buffer 46 and rewritten into the check bit storage portion of the RAM 22. Again the corrected check bit word rewritten into the RAM 22 greatly reduces the potential for errors to accumulate to thereby produce fatal double errors in subsequent readings of that address portion of the RAM.

Inasmuch as the timing and control circuit 12 is self contained on the RAM card 4, and is responsive only to instruction signals from the central processor unit 2, the operation of the error detection, correction and rewrite functions on the RAM card 4 are totally transparent to the central processor unit 2. Those functions are not dependent upon or responsive to specific control or timing signals from the central processor unit. Further they are accomplished without interruption to the reading and writing functions of the RAM card with respect to transmissions to and from the central processor unit.

Thus there has been provided, in accordance with the present invention, an improved RAM card featuring self contained error detection and correction capability and wherein the corrected data and check bit codes are rewritten into the RAM itself, thereby to avoid cumulative errors.

The embodiments of the invention in which an exclusive property or privilege is claimed are defined as follows:

1. A memory assembly for a computer comprising:
   first memory means into which digital data words may be written for storage and from which digital data words may be read;
   check bit generating means connected to be responsive to said digital data words to produce a check bit code word corresponding to the content of each of said data words;
   second memory means into which said check bit code words may be written for storage and from which said check bit code words may be read, said check bit code word being generated by said generating means and written into said second memory means in response to and corresponding to digital data words being written into said first memory means;
   first means for reading a digital data word from said first memory means;
   said generating means being further connected to said first reading means for generating a further check bit code word in response to and corresponding to a digital data word read from said first memory means,
   second means for reading a check bit code word from said second memory means in response to and corresponding to a digital data word read from said first memory means,
   comparator means for comparing said check bit code word read from said second memory means with said further check bit code word to detect a difference therebetween as an indication of an error in the storage of said words,
   decoder means connected to be responsive to a detected difference output from said comparator means to produce a correction signal;
   correction means connected to be responsive to said correction signal to correct said words read out of said memory means, and
   means connected to said correction means to rewrite the corrected words into said memory means.

2. A memory assembly as set forth in claim 1 wherein said decoder means includes a first decoder means connected to the output of said comparator for determining the type of error indicated by said detected difference and further decoder means connected to the output of said first decoder means to determine the bit position of an error detected by said comparator.

3. A memory assembly as set forth in claim 2 wherein said further decoder means includes data word error decoder connected to be responsive to signals from said first decoder means indicative of an error in the data word to determine the bit position of an error in said data word and a check bit word error decoder connected to be responsive to signals from said first decoder means indicative of an error in said check bit code word to determine the bit position of an error in said check bit code word.

4. A memory assembly as set forth in claim 3 wherein said correction means includes first EXCLUSIVE-OR means connected to the output of said data word error decoder to combine the error correction signal from said data word error decoder with said digital data word read from said first memory means to provide a corrected digital data word at the output of said first EXCLUSIVE-OR means, and second EXCLUSIVE-OR means connected to the output of said check bit code word error decoder to combine the error correction signal from said check bit code word error decoder with said check bit code word read from said second memory means to provide a corrected check bit code word at the output of said second EXCLUSIVE-OR means.

5. A memory assembly as set forth in claim 4 wherein said output of said first EXCLUSIVE-OR means is connected to an output of said memory assembly and to an input of said first memory means whereby to write said corrected digital data word into said first memory means, and said output of said second EXCLUSIVE-OR means is connected to an input of said second memory means whereby to write said corrected check bit code word into said second memory means.

6. A memory assembly as set forth in claim 5 wherein said means for reading a digital data word from said first memory means includes a first holding latch means and said means for reading a check bit code word from said second memory means includes a second holding latch means.

7. A memory assembly as set forth in claim 6 wherein said assembly further includes internal timing and control means, connected to be responsive to instruction signals from said computer for controlling the operation of said assembly independently of said computer.

* * * * *